United States Patent
Bae

(10) Patent No.: US 12,254,658 B2
(45) Date of Patent: Mar. 18, 2025

(54) MULTI-RESOLUTION IMAGE PROCESSING DEVICE AND METHOD CAPABLE OF PROCESSING RECOGNITION OF MULTIPLE DYNAMIC OBJECTS

(71) Applicant: BISANG CO., LTD., Seoul (KR)

(72) Inventor: Gyoung Hae Bae, Gwacheon-si (KR)

( * ) Notice: Subject to any disclaimer, the term of this patent is extended or adjusted under 35 U.S.C. 154(b) by 359 days.

(21) Appl. No.: 17/871,900

(22) Filed: Jul. 23, 2022

(65) Prior Publication Data
US 2022/0358744 A1 Nov. 10, 2022

Related U.S. Application Data

(63) Continuation of application No. PCT/KR2021/006156, filed on Jun. 17, 2021.

(30) Foreign Application Priority Data

Apr. 29, 2021 (KR) .......................... 10-2021-0055926

(51) Int. Cl.
*G06V 10/25* (2022.01)
*G06T 7/246* (2017.01)
*G06V 10/20* (2022.01)

(52) U.S. Cl.
CPC .............. *G06V 10/25* (2022.01); *G06T 7/246* (2017.01); *G06V 10/255* (2022.01)

(58) Field of Classification Search
CPC ...... G06V 10/25; G06V 10/255; G06V 10/82; G06V 20/625; G06V 40/172; G06V 10/40;
(Continued)

(56) References Cited

U.S. PATENT DOCUMENTS

2011/0050656 A1 3/2011 Kotaro et al.
2012/0045090 A1* 2/2012 Bobbitt ..................... G06T 7/97
382/103
(Continued)

FOREIGN PATENT DOCUMENTS

KR 10-1173853 8/2012
KR 10-1365237 2/2014
(Continued)

OTHER PUBLICATIONS

English Specification of 10-1365237.
(Continued)

*Primary Examiner* — Samir A Ahmed
(74) *Attorney, Agent, or Firm* — ANTONIO HA & U.S. PATENT, LLC

(57) ABSTRACT

According to an embodiment of the present invention, a multi-resolution image processing device capable of recognition of a plurality of dynamic objects comprises a dynamic object identifier extracting a motion vector from an input image and identifying a dynamic object; a dynamic object ID imparter assigning an ID to the dynamic object identified by the dynamic object identifier; a dynamic object artificial intelligence determiner determining an authenticity of the dynamic object identified by the dynamic object identifier based on a standard shape for each type of dynamic object learned and stored, classifying at least one object of interest and object of no interest designated by a user, and removing the object of no interest; a region-of-interest detector extracting a feature point from the at least one object of interest and setting at least a portion of the object of interest as a region of interest; and a variable compressor compressing the image with different compression rates for the region of interest and the object of interest.

5 Claims, 14 Drawing Sheets

(58) Field of Classification Search
CPC ... G06T 7/246; G06T 5/50; G06T 7/11; G06T 9/00
See application file for complete search history.

(56) References Cited

U.S. PATENT DOCUMENTS

2016/0224864 A1* 8/2016 Chang .................... G06V 10/56
2019/0072977 A1* 3/2019 Jeon ....................... G06V 10/25
2021/0278858 A1* 9/2021 Jeon ....................... G06V 10/82

FOREIGN PATENT DOCUMENTS

| KR | 10-2015-0104288 | | 9/2015 |
| KR | 10-2016-0093809 | | 8/2016 |
| KR | 10-1704775 | | 2/2017 |
| KR | 10-2019-0026116 | | 3/2019 |
| KR | 20200058260 A | * | 5/2020 |

OTHER PUBLICATIONS

English Specification of 10-1704775.
English Specification of 10-1173853.
English Specification of 10-2015-0104288.
English Specification of 10-2019-0026116.
English Specification of 10-2016-0093809.

* cited by examiner

MULTI-RESOLUTION IMAGE PROCESSING DEVICE AND METHOD CAPABLE OF PROCESSING RECOGNITION OF MULTIPLE DYNAMIC OBJECTS

CROSS-REFERENCE TO RELATED APPLICATION

This application is a continuation of International Patent Application No. PCT/KR2021/006156 filed on Jun. 17, 2021, which claims priority to Korean Patent Application No. 10-2021-0055926 filed in the Korean Intellectual Property Office on Apr. 29, 2021, the disclosures of which are incorporated by reference herein in their entireties.

TECHNICAL FIELD

The present invention relates to a multi-resolution image processing device and method capable of processing recognition of a plurality of dynamic objects.

BACKGROUND ART

As image systems have various applications, various demands arise for image processing technology. For example, there are demand for storing images for a longer time or storing higher-resolution images.

The conventional art compresses the entire image into a constant resolution due to limits to the capacity of the image storage device or the image transmission band.

Recent image compression techniques extract only portions changed as compared with the prior frame and compress only the changed portions and, in this case, compression is performed according to a fixed resolution, rather than in various resolutions according to analysis of importance of the changed images.

Therefore, inefficiency occurs in compression of high-resolution images. Further, due to the large file size, file transmission traffic increases, and a high storage capacity is required. To address such issues, a significant cost is required.

SUMMARY

An object of the present invention is to provide a multi-resolution image processing device and method applied to recognition of a plurality of dynamic objects, which may address the foregoing issues with the prior art.

To achieve the foregoing objectives, according to an embodiment of the present invention, a multi-resolution image processing device capable of recognition of a plurality of dynamic objects comprises a dynamic object identifier extracting a motion vector from an input image and identifying a dynamic object; a dynamic object ID imparter assigning an ID to the dynamic object identified by the dynamic object identifier; a dynamic object artificial intelligence determiner determining an authenticity of the dynamic object identified by the dynamic object identifier based on a standard shape for each type of dynamic object learned and stored, classifying at least one object of interest and object of no interest, and removing the object of no interest; a region-of-interest detector extracting a feature point from the at least one object of interest and setting at least a portion of the object of interest as a region of interest; and a variable compressor compressing the image with different compression rates for the region of interest and the object of interest.

To achieve the foregoing objectives, according to an embodiment of the present invention, a multi-resolution image processing method capable of recognition of a plurality of dynamic objects comprises the steps of extracting a motion vector from an input image and identifying a dynamic object, by a dynamic object identifier; assigning an ID to the dynamic object identified by the dynamic object identifier, by a dynamic object ID imparter; determining an authenticity of the dynamic object identified by the dynamic object identifier based on a standard shape for each type of dynamic object learned and stored, classifying at least one object of interest and object of no interest designated by a user, and removing the object of no interest, by a dynamic object artificial intelligence determiner; extracting a feature point from the at least one object of interest and setting at least a portion of the object of interest as a region of interest, by a region-of-interest detector; compressing the image with different compression rates for the region of interest and the object of interest, by a variable compressor; and searching for, and providing, the dynamic object and/or the object of interest in videos of different times matching a condition inputted by the user, by an image searcher.

The multi-resolution image processing device and method capable of processing recognition of a plurality of dynamic objects according to an embodiment of the present invention may recognize objects per dynamic object when there are a plurality of dynamic objects, move the region of interest according to the movement of the dynamic objects, break down the region of interest of the objects, compress them with multiple resolutions and transmit it, thereby minimizing the time required for storage and search.

Thus, it is possible to reduce communication data and minimize the storage space, thereby allowing the existing communication infrastructure and storage to be used as it is or minimizing an increase in cost.

MODE TO PRACTICE THE INVENTION

The terms as used herein are provided merely to describe some embodiments thereof, but not to limit the present disclosure. The terms as used herein are provided merely to describe some embodiments thereof, but not to limit the scope of other embodiments of the present disclosure. Unless otherwise defined, all terms including technical and scientific terms used herein have the same meaning as commonly understood by one of ordinary skill in the art to which the embodiments of the present invention pertain and should not be interpreted as overly broad or narrow. As used herein, terms wrong or inappropriate for representing the spirit of the present invention may be replaced with and understood as more proper ones to represent the spirit of the present invention by one of ordinary skill in the art. General terms as used herein should be interpreted in the context of the specification or as defined in dictionaries.

As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure.

Hereinafter, exemplary embodiments of the inventive concept will be described in detail with reference to the accompanying drawings. The same reference denotations may be used to refer to the same or substantially the same elements throughout the specification and the drawings. No duplicate description of the same elements is given herein.

When determined to make the subject matter of the present invention unclear, the detailed description of the known art or functions may be skipped. The accompanying drawings are provided for an easier understanding of the spirit of the reception but the present invention should not be limited thereby.

Hereinafter, a multi-resolution image processing device and method capable of processing recognition of a plurality of dynamic objects according to an embodiment of the present invention is described in greater detail with reference to the accompanying drawings.

Figure 1:
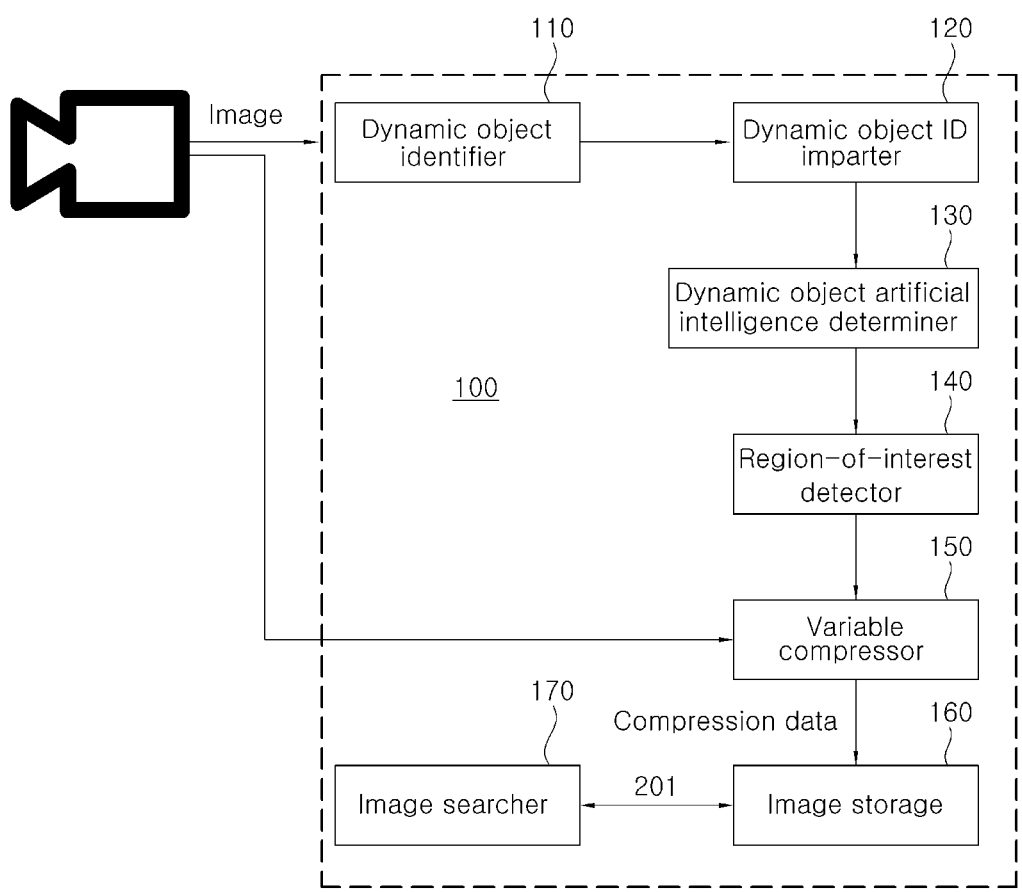
FIG. 1 is a block diagram illustrating a multi-resolution image processing device capable of processing recognition of a plurality of dynamic objects according to an embodiment of the present invention.
Figure 2:
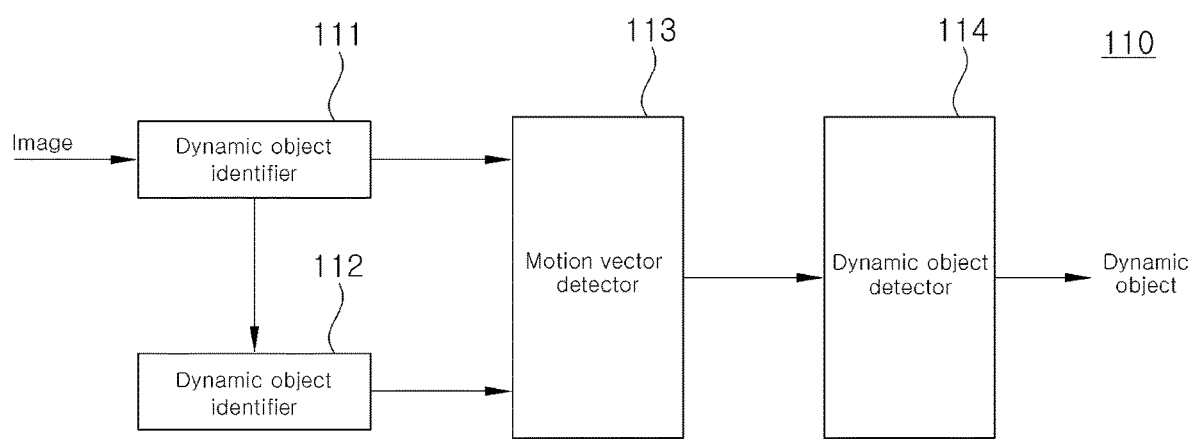
FIG. 2 is a block diagram illustrating a configuration of a dynamic object identifier of FIG. 1 according to an embodiment.
Figure 3:
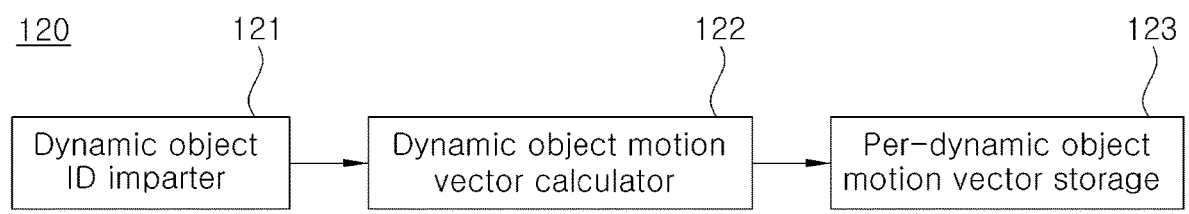
FIG. 3 is a block diagram illustrating a configuration of a dynamic object ID imparter of FIG. 1 according to an embodiment.
Figure 4:
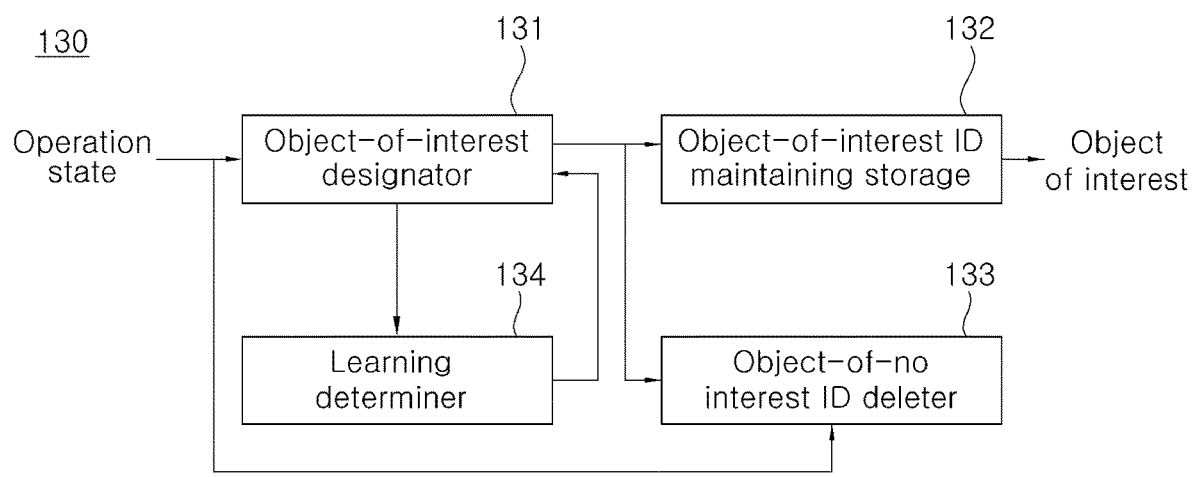
FIG. 4 is a block diagram illustrating a configuration of a dynamic object artificial intelligence determiner of FIG. 1 according to an embodiment.

FIG. 1 is a block diagram illustrating a multi-resolution image processing device capable of processing recognition of a plurality of dynamic objects according to an embodiment of the present invention. FIG. 2 is a block diagram illustrating a configuration of a dynamic object identifier of FIG. 1 according to an embodiment. FIG. 3 is a block diagram illustrating a configuration of a dynamic object ID imparter of FIG. 1 according to an embodiment. FIG. 4 is a block diagram illustrating a configuration of a dynamic object artificial intelligence determiner of FIG. 1 according to an embodiment.

Figure 5:
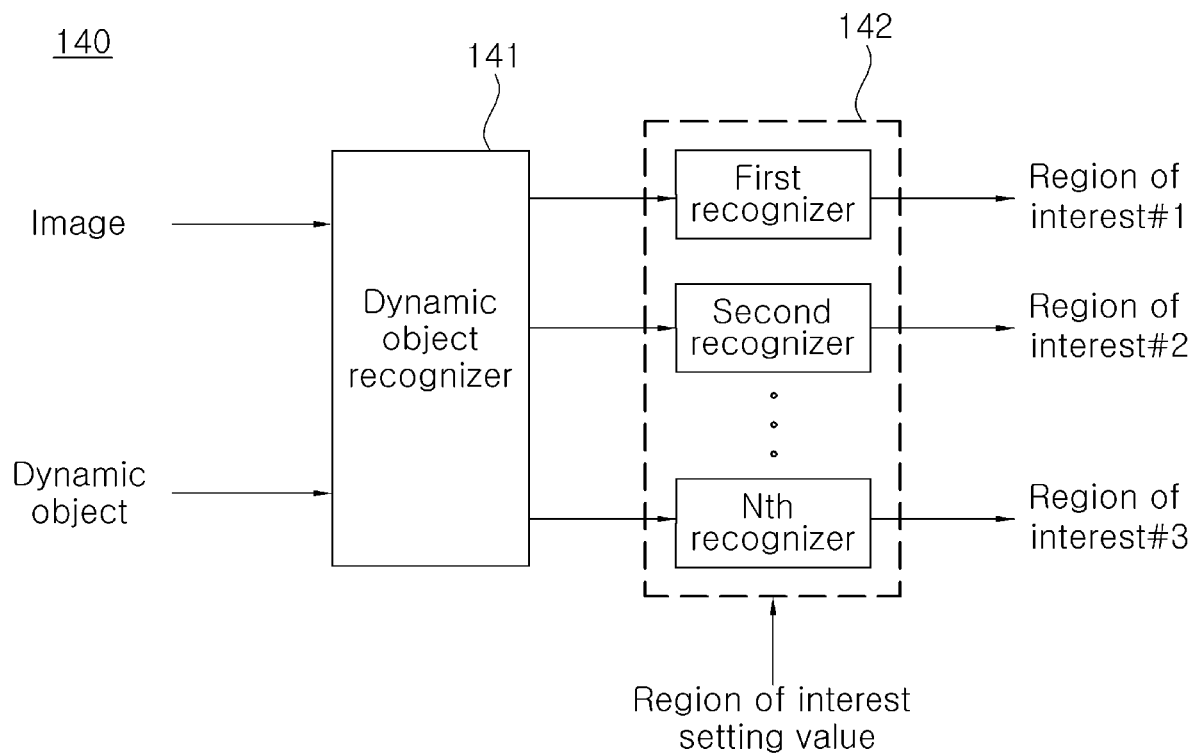
FIG. 5 is a block diagram illustrating a configuration of a region-of-interest detector of FIG. 1 according to an embodiment.
Figure 6:
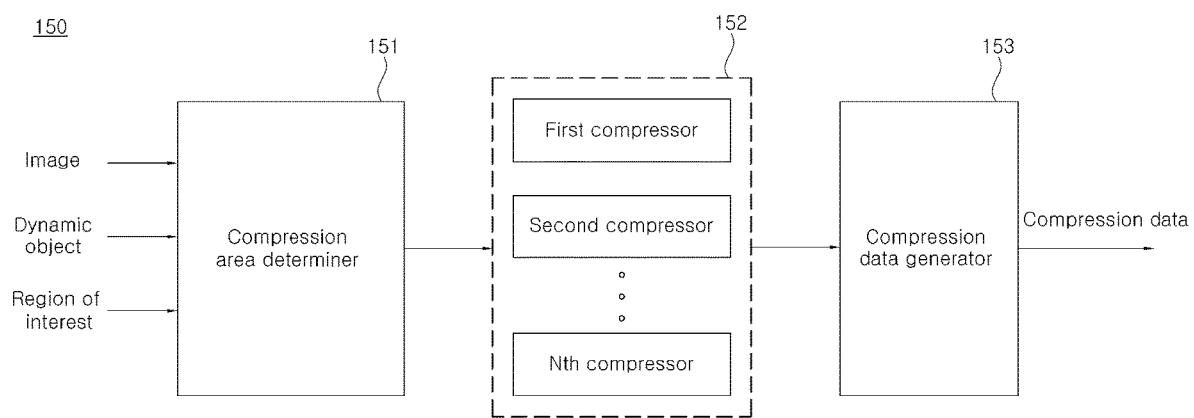
FIG. 6 is a block diagram illustrating a configuration of a variable compressor of FIG. 1 according to an embodiment.
Figure 7:
FIG. 7 is a view illustrating an example of an input image.
Figure 8:
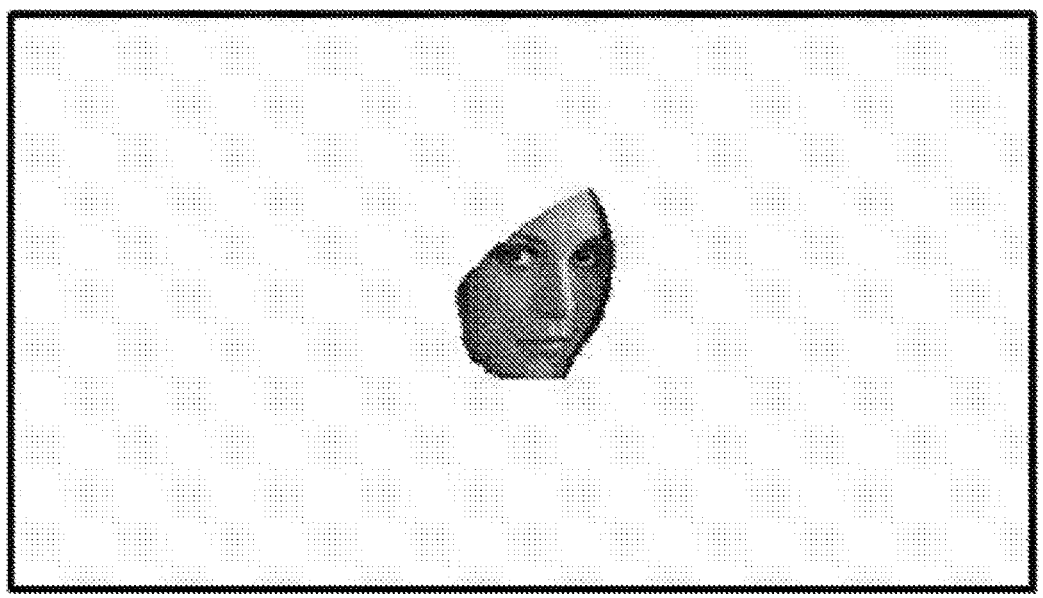
FIG. 8 is a view illustrating a region of interest extracted from the input image of FIG. 7.
Figure 9:
FIG. 9 is a view illustrating an example of decoding data, decoded with different compression rates for a region of interest and other areas, on the input image of FIG. 7.

FIG. 5 is a block diagram illustrating a configuration of a region-of-interest detector of FIG. 1 according to an embodiment. FIG. 6 is a block diagram illustrating a configuration of a variable compressor of FIG. 1 according to an embodiment. FIG. 7 is a view illustrating an example of an input image. FIG. 8 is a view illustrating a region of interest extracted from the input image of FIG. 7. FIG. 9 is a view illustrating an example of decoding data, decoded with different compression rates for a region of interest and other areas, on the input image of FIG. 7.

Referring to FIG. 1, according to an embodiment of the present invention, an image may be input from a camera 10 to a multi-resolution image processing device 100 capable of processing recognition of a plurality of dynamic objects may receive an image.

The multi-resolution image processing device 100 may set at least one region of interest for the input image. The multi-resolution image processing device 100 may set at least one different compression rate for a region of interest and the other areas and compress the image, generating compressed data.

The compressed data may be provided to an image storage device 200. Although not shown, the compressed data may be transmitted through a network.

The multi-resolution image processing device 100 may compress a highest region of interest of the image with a lowest compression rate to maintain a highest image quality of a step designated by the user, compress a region of interest of a next step with a high compression rate to maintain a next step of image quality, and compress the other areas with a highest compression rate to maintain a low image quality designated by the user. For example, the image processing device 100 may set, e.g., a human face or vehicle license plate as the highest region of interest, set a human or vehicle, which is a dynamic object, as the next step of region of interest, and set the background, which is stationary, or an animal, which is a dynamic object of no interest, as other areas.

Accordingly, the size of the compressed data generated by the multi-resolution image processing device 100 may be significantly reduced, and when the compressed data is decoded, the portion containing important information in the image, i.e., the portion corresponding to the region of interest, may secure a high resolution.

Referring to FIG. 2, the image processing device 100 may include a dynamic object identifier 110, a dynamic object ID imparter 120, a dynamic object artificial intelligence determiner 130, a region-of-interest detector 140, a variable compressor 150, an image storage device 160, and an image searcher 170.

More specifically, the dynamic object identifier 110 may extract a motion vector from the input image and identify a dynamic object. For example, the dynamic object identifier 110 may recognize a moving vehicle or person in the image and identify it as a dynamic object.

The dynamic object identifier 110 may include first storage 111, second storage 112, a motion vector detector 113, and a dynamic object detector 114.

The image may include a plurality of consecutive frames. The first storage 111 and the second storage 112 may store the image corresponding to each frame.

The first storage 111 may provide the stored image to the second storage 112 and may store a new frame of image. Thus, a first image stored in the first storage 111 and a second image stored in the second storage 112 correspond to two consecutive frames.

The motion vector detector 113 may compare the first image stored in the first storage 111 with the second image stored in the second storage 112 to thereby detect the motion vector. Various motion vector detection algorithms may be applied to the motion vector detector 113.

The dynamic object detector 114 may determine the dynamic object using the motion vector. The dynamic object may be a dynamic area corresponding to a specific object that is moving in the image and, as described above, the dynamic object is a target subject to image compression.

Next, the dynamic object ID imparter 120 is component that imparts an ID to the dynamic object identified by the dynamic object identifier 110 and includes a dynamic object ID allocator 121, a dynamic object motion vector calculator 122, and a per-dynamic object motion vector storage 122.

The dynamic object ID allocator 121 may be a component that assigns an ID according to the type of the dynamic object.

The dynamic object motion vector calculator 122 may be a component that calculates the motion vectors of the ID-assigned dynamic objects.

The per-dynamic object motion vector storage 122 may be a component that stores the motion vector of the ID-assigned dynamic object.

Next, the dynamic object artificial intelligence determiner 130 may be a component that determines the authenticity of the dynamic object identified by the dynamic object identifier 110 based on a standard shape for each type of dynamic object learned and stored, classifies an object of interest and an object of no interest designated by the user, and removes the object of no interest.

The dynamic object artificial intelligence determiner 130 includes an object-of-interest designator 131, an object-of-interest ID maintaining storage 132, an object-of-no interest ID deleter 133, and a learning determiner 134.

The object-of-interest designator 131 may be a component that designates an object-of-interest among dynamic objects based on the user's input information.

The object-of-interest ID maintaining storage 132 may be a component that maintains the ID of the designated object of interest.

The object-of-no interest ID deleter 133 may be a component that filters to delete the IDs of other dynamic objects (IDs of objects of no interest) than the object of interest among the identified dynamic objects.

The learning determiner 134 is a component that determines the authenticity of the object of interest based on dynamic objects learned and stored and determines the authenticity using a deep learning determination algorithm.

Here, deep learning is a technique that is used to cluster or classify objects or data. This is a technique that inputs massive data to a computer and classifies similar ones.

In this case, many machine learning algorithms have already appeared on how to classify data. Deep learning is an artificial intelligence learning method proposed to overcome the limitations of artificial neural networks. The deep learning discrimination algorithm may include a deep belief network, an autoencoder, a convolutional neural network (CNN), a recurrent neural network (RNN), a deep Q-network, and the like, and the deep learning algorithm enumerated in the present invention is merely an example but is not limited thereto.

In the present invention, although an example in which the convolutional neural network (CNN) which is one of the above-enumerated deep learning algorithms is applied to determine dynamic objects is described, the present invention is not limited thereto, and various types of deep learning algorithms may be used depending on the user's selection.

The region-of-interest detector 140 extracts a feature point from the dynamic object and sets at least a portion of the dynamic object as a region of interest.

For example, the region-of-interest detector 140 may set a person, which is identified as a region of interest, as a common grade of region of interest, recognize the face from the identified person and set the recognized face as a highest grade of region of interest, or recognize a vehicle, identified as a dynamic object, as a common grade of region of interest and set the license plate of the identified vehicle as a highest grade of region of interest.

The region-of-interest detector 140 includes a dynamic object recognizer 141 and a region-of-interest recognizer 142.

The dynamic object recognizer 141 may receive an image and a dynamic object and determine the type of the dynamic object. According to an embodiment, the dynamic object recognizer 141 may receive the image and determine the type of the dynamic object by referring to the image.

The region-of-interest recognizer 142 may be a component that recognizes the region of interest according to the type of the dynamic object set by the user.

For example, if the dynamic object is a person, the region-of-interest recognizer 142 may detect the area corresponding to the face of the dynamic object and recognize it as the region of interest or, if the dynamic object is a vehicle, the region-of-interest recognizer 142 may detect the area corresponding to the license plate of the dynamic object and recognize it as the region of interest. For reference, the region-of-interest recognizer 142 may adopt various recognition algorithms, such as a face recognition algorithm or a character recognition algorithm, depending on the type of the object of interest.

Meanwhile, although the person's face and the vehicle's license plate are provided as examples in describing the configuration of the region-of-interest detector 140, the present invention is not limited thereto. Accordingly, there may be other various dynamic objects than person and vehicle, and such various dynamic objects may include, e.g., buses, trucks, taxis, bicycles, motorcycles, trains, airplanes, ships, hang gliders, drones, or scooters. Further, the region-of-interest detector 140 may set a region of interest having main information from the dynamic object.

Next, the variable compressor 150 may compress the image with different compression rates for the region of interest and the dynamic object. Or, the variable compressor 150 may compress the image with different resolutions or compression rates for the region of interest and the other areas, depending on the degree of interest. For example, the variable compressor 150 may compress non-dynamic objects with a low image quality and a high compression rate, compress the region of interest with a medium image quality and a medium compression rate, and compress the region of highest interest with a low compression rate or may not compress the region of highest interest.

According to an embodiment, the variable compressor 150 may perform image compression on the dynamic object which changes between each frame of the image and its previous frame and may perform no image compression for image transmission on the remaining area, except for the dynamic object, which does not change from the previous frame, as an image portion of no interest. For example, the background except for the vehicle which is a dynamic object in the image where the vehicle is moving may be represented as the same image data in the plurality of frames. Accordingly, the variable compressor 150 does not perform image compression on the other areas than the area not changed from the previous frame, i.e., non-dynamic object areas, thereby reducing the size of the image data.

According to an embodiment, the variable compressor 150 may perform lossless compression on the region of interest while performing lossy compression on the dynamic object. For example, when the image has a first resolution, the variable compressor 150 may perform lossless compression on the region of interest to have the first resolution. In other words, the region of interest may have the resolution of the original image.

Meanwhile, the variable compressor 150 may perform lossy compression on the dynamic object to have a second resolution lower than the first resolution. This is because the region of interest includes main information, but the remaining area of the dynamic object does not include main information. As such, it is possible to reduce the size of the image data by performing compression so that only the region of interest maintains the high resolution while the rest has a reduced resolution.

According to an embodiment, the variable compressor 150 may compress the image so that the region of interest, dynamic object, and the remaining area in the image have different resolutions. For example, the variable compressor 150 may compress the image so that the region of interest has the first resolution, the dynamic object has the second resolution, and the other area than the region of interest and the dynamic object has a third resolution. Here, the first resolution may be higher than the second resolution, and the second resolution may be higher than the third resolution.

According to an embodiment, the variable compressor 150 may periodically compress and transmit the entire image of the frame. In general, compression is performed on the changed portion in the entire image. Periodically compressing the entire image of the frame may increase the reliability of restoration of the image.

More specifically, referring to FIG. 6, the variable compressor 150 may include a compression area determiner 151, a compression unit 152, and a compression data generator 153.

The compression area determiner 151 may receive an image, dynamic object, and region of interest. The compression area determiner 151 may differentiate between to-be-compressed areas and between compression rates for the areas and provide the areas to the compression unit 152.

For example, the compression unit 152 may include a plurality of compressors that may include at least one lossless compressor or lossy compressor. The compression unit may compress the region of interest through a first compressor to an n−1th compressor and compress the dynamic object through an nth compressor. Next, the compression data generator 153 may generate one compression data based on the compression data output from the plurality of compressors.

According to an embodiment, the number of the compressors may be varied, so that each area in one image may be compressed with a different compression rate.

However, commonly for various embodiments, the region of interest may have a higher resolution than the other areas. For example, the region of interest may maintain the resolution of the original image.

FIGS. 7 to 9 illustrate an example of differentially compressing areas of an image. An example of processing by the image processing device 100 is described below with reference to FIGS. 7 to 9.

FIG. 7 is a view illustrating an example of an input image and shows an image input from, e.g., a camera.

FIG. 8 is a view illustrating a region of interest extracted from the input image of FIG. 7. The image processing device 100 may detect a region of interest from the image. In the illustrated example, a person's face area is detected as the region of interest.

FIG. 9 is a view illustrating an example of decoding data, decoded with different compression rates for a region of interest and other areas, on the input image of FIG. 7.

In other words, it may be seen that the person's face, which is the region of interest, has the same resolution as that of the image shown in FIG. 7, but the other areas have a lower resolution. In other words, it is possible to significantly reduce the size of the compression data by maintaining the high resolution for the main region of interest while reducing the resolution of the other areas. Accordingly, it is possible to facilitate transmission or storage of the compression data.

Next, the image searcher 170 may be a component that searches for a dynamic object and/or object of interest in videos of different times which match the user's input condition.

Specifically, the image searcher 170 includes a dynamic object search condition input unit 171, a per-condition search video extractor 172, a time synchronizer 173, and a backup unit 174.

The dynamic object search condition input unit 171 may be a component that receives a search condition for searching for the image including the region of interest matching the condition inputted by the user.

The per-condition search video extractor 172 may be a component that extracts the image matching the search condition.

The time synchronizer 173 may be a component that time-synchronizes images matching the same search condition among the images captured at different times and, if a search condition is inputted, the time synchronizer 173 may assist playing a plurality of images matching the search condition.

The time synchronizer 173 may include time synchronization software/software-equipped recorder/software-equipped storage. The time synchronization software may be equipped on a USB, CD, RAM, SSD, or HDD.

The backup unit 174 may be a component that backs up the time-synchronized images.

Meanwhile, the image processing device 100 according to an embodiment of the present invention may include a representative image generator (not shown) and a transmitter (not shown).

The representative image generator may receive information about the region of interest from the region-of-interest detector and generate a representative image based on the region of interest. For example, the representative image generator may set the region of interest, which is repeatedly present in most frames of the image, as the representative image.

The representative image may be used as an image representing the compression data.

The transmitter may add the representative image to the compression data provided from the variable compressor and transmit it to the storage device.

Figure 10:
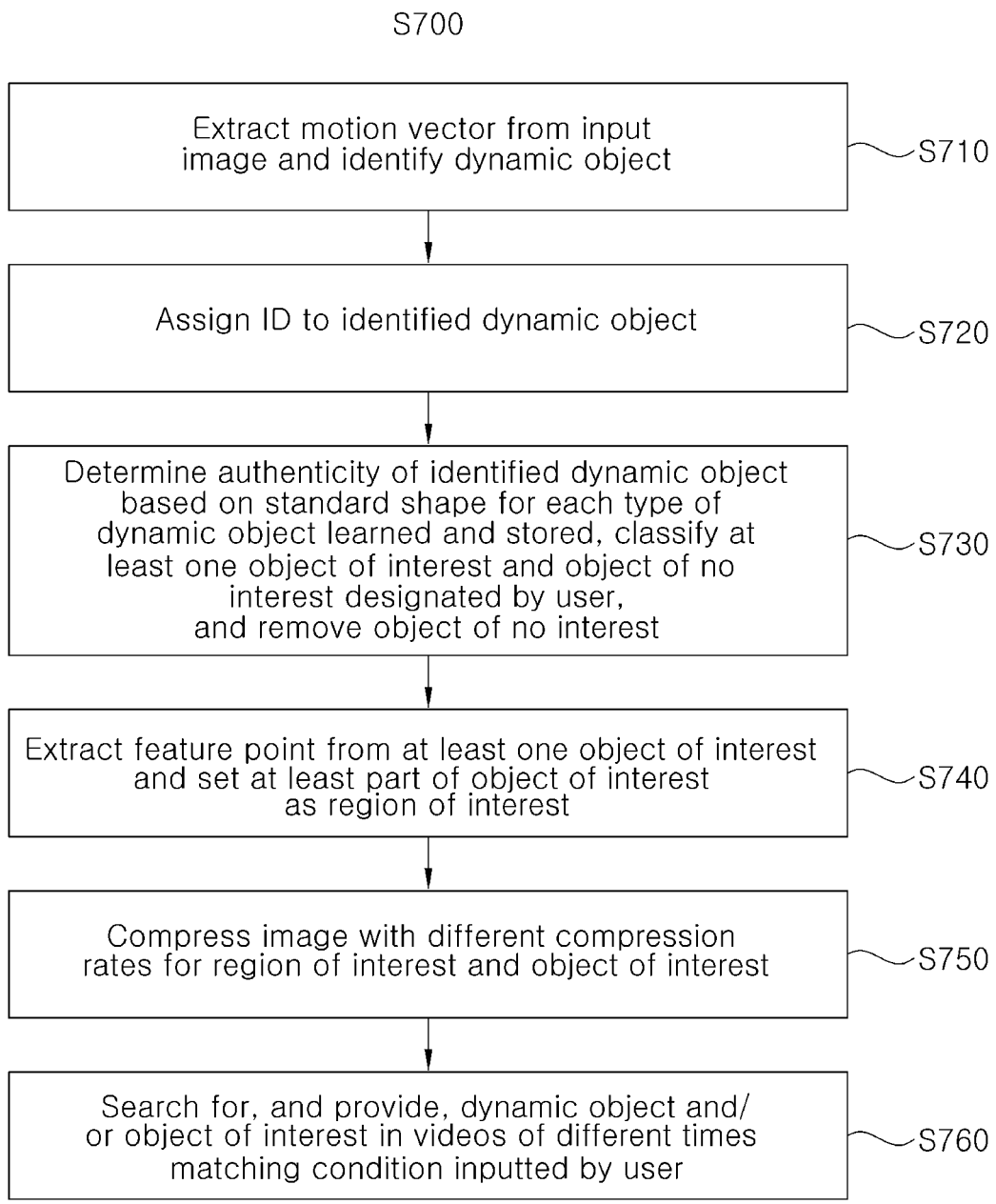
FIG. 10 is a flowchart illustrating an image processing method according to an embodiment of the present invention.
Figure 11:
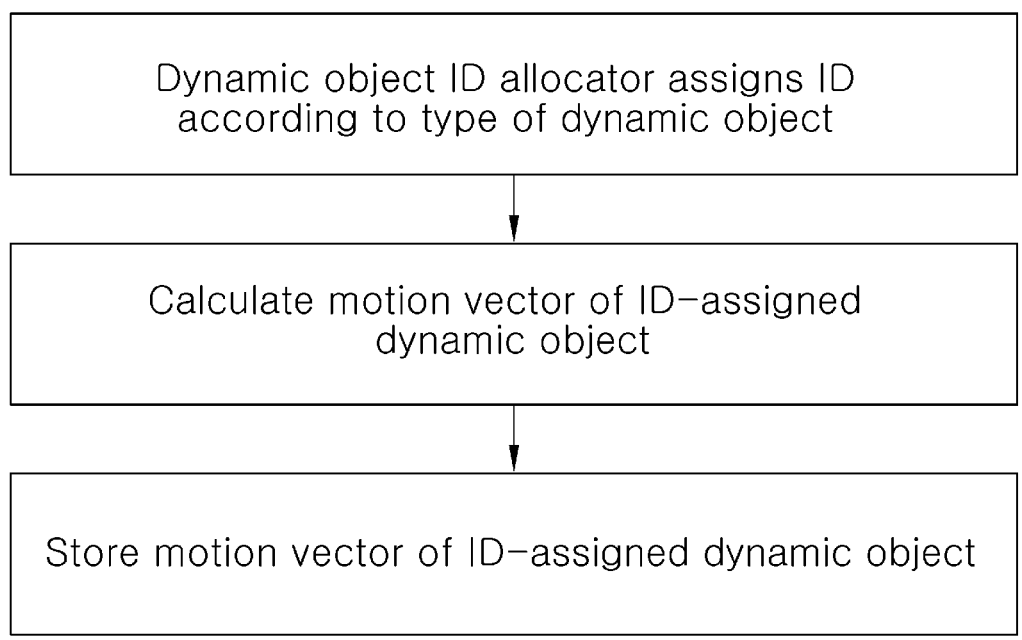
FIG. 11 is a flowchart illustrating step S720 of FIG. 10.
Figure 12:
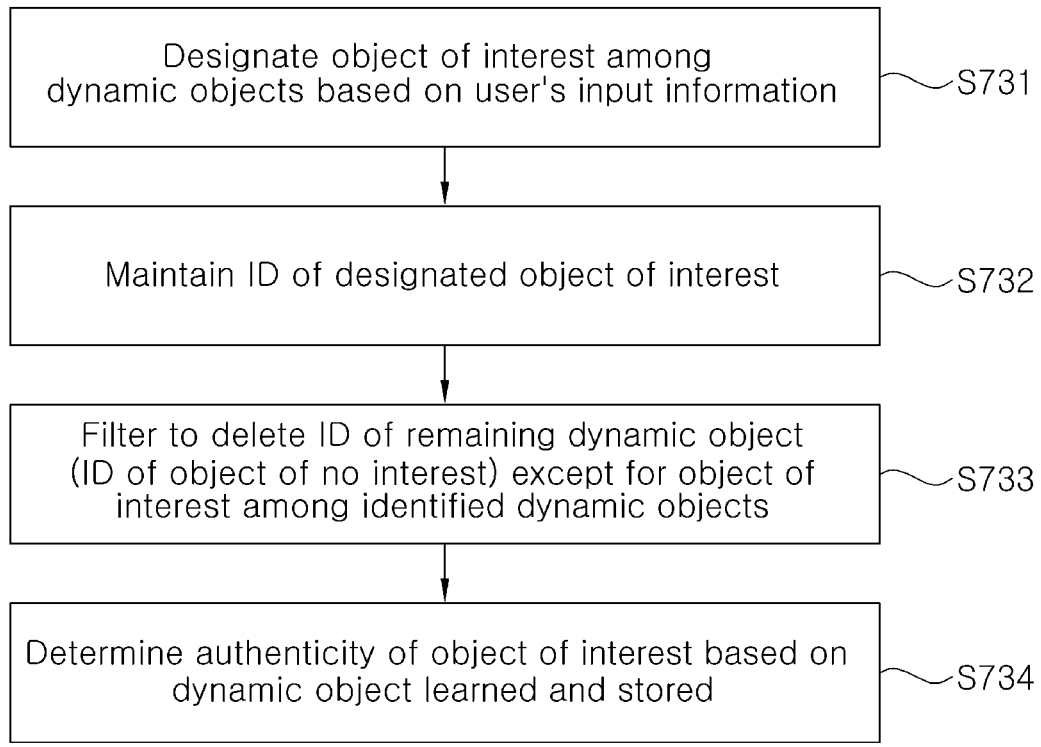
FIG. 12 is a flowchart illustrating step S730 of FIG. 10.
Figure 13:
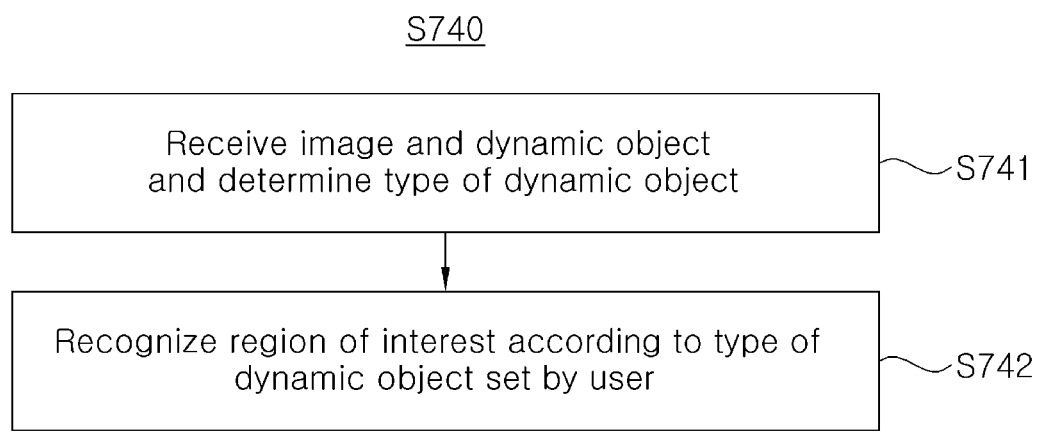
FIG. 13 is a flowchart illustrating step S740 of FIG. 10.
Figure 14:
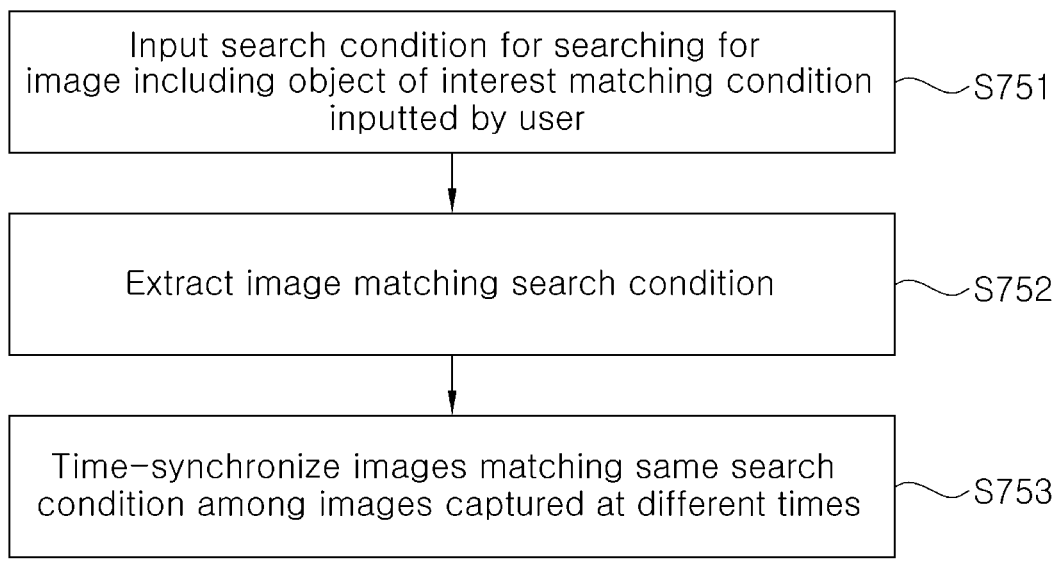
FIG. 14 is a flowchart illustrating step S750 of FIG. 10.

FIG. 10 is a flowchart illustrating an image processing method according to an embodiment of the present invention. FIG. 11 is a flowchart illustrating step S720 of FIG. 10. FIG. 12 is a flowchart illustrating step S730 of FIG. 10. FIG. 13 is a flowchart illustrating step S740 of FIG. 10. FIG. 14 is a flowchart illustrating step S750 of FIG. 10.

First, as shown in FIG. 10, a multi-resolution image processing method S700 capable of processing recognition of a plurality of dynamic objects according to an embodiment of the present invention extracts a motion vector from an image inputted from the dynamic object identifier 110 and identifies the dynamic object (S710).

The dynamic object identifier 110 may include first storage 111, second storage 112, a motion vector detector 113, and a dynamic object detector 114.

The image may include a plurality of consecutive frames. The first storage 111 and the second storage 112 may store the image corresponding to each frame.

The first storage 111 may provide the stored image to the second storage 112 and may store a new frame of image. Thus, a first image stored in the first storage 111 and a second image stored in the second storage 112 correspond to two consecutive frames.

The motion vector detector 113 may compare the first image stored in the first storage 111 with the second image stored in the second storage 112 to thereby detect the motion vector. Various motion vector detection algorithms may be applied to the motion vector detector 113.

The dynamic object detector 114 may determine the dynamic object using the motion vector. The dynamic object may be a dynamic area corresponding to a specific object that is moving in the image and, as described above, the dynamic object is a target subject to image compression.

Thereafter, the dynamic object ID imparter 120 assigns an ID to the dynamic object identified by the dynamic object identifier 110 (S720).

Step S720 may be a component in which the dynamic object ID allocator 121 assigns an ID according to the type of the dynamic object. The dynamic object motion vector calculator 122 may be a component that calculates the motion vectors of the ID-assigned dynamic objects. The per-dynamic object motion vector storage 122 may be a component that stores the motion vector of the ID-assigned dynamic object.

The dynamic object artificial intelligence determiner determines the authenticity of the dynamic object identified by the dynamic object identifier 110 based on a standard shape for each type of dynamic object learned and stored, classifies at least one object of interest and object of no interest designated by the user, and removes the object of no interest.

More specifically, step S730 may include step S731 in which the object-of-interest designator 131 designates an object of interest among dynamic objects based on the user's input information, step S732 in which the object-of-interest ID maintaining storage 132 maintains the ID of the designated object of interest, step S733 in which the object-of-no interest ID deleter 133 filters to delete the IDs of other dynamic objects (IDs of objects of no interest) than the object of interest among the identified dynamic objects, and step S734 in which the learning determiner 134 determines the authenticity of the object of interest based on dynamic objects learned and stored and determines the authenticity using a deep learning determination algorithm.

Next, the region-of-interest detector 140 extracts a feature point from the at least one object of interest and sets at least one portion of the object of interest as a region of interest (S740).

Here, step S740 may include step S741 in which the dynamic object recognizer 141 receives an image and a dynamic object and determine the type of the dynamic object and step S742 in which the region-of-interest recognizer 142 recognizes the region of interest according to the type of the dynamic object set by the user.

For example, if the dynamic object is a person, the region-of-interest recognizer 142 may detect the area corresponding to the face of the dynamic object and recognize it as the region of interest or, if the dynamic object is a vehicle, the region-of-interest recognizer 142 may detect the area corresponding to the license plate of the dynamic object and recognize it as the region of interest. For reference, the region-of-interest recognizer 142 may adopt various recognition algorithms, such as a face recognition algorithm or a character recognition algorithm, depending on the type of the object of interest.

Meanwhile, although the person's face and the vehicle's license plate are provided as examples in describing the configuration of the region-of-interest detector 140, the present invention is not limited thereto. Accordingly, as the dynamic object, various dynamic objects may exist in addition to people and cars. The region-of-interest detector 140 may set the region of interest having main information from the dynamic object.

Thereafter, the variable compressor 150 compresses the image with different compression rates for the region of interest and the object of interest (S740).

The variable compressor 150 may compress the image with different compression rates for the region of interest and the dynamic object. Or, the variable compressor 150 may compress the image with different compression rates for the region of interest and the other areas of the image. For example, the variable compressor 150 may compress the dynamic object with a high compression rate to have low image quality and compress the region of interest with a low compression rate to maintain the high image quality or may not compress the region of interest.

According to an embodiment, the variable compressor 150 may perform image compression on the dynamic object which changes between each frame of the image and its previous frame and may perform no image compression on the remaining area, except for the dynamic object, which does not change from the previous frame. For example, the background except for the vehicle which is a dynamic object in the image where the vehicle is moving may be represented as the same image data in the plurality of frames. Accordingly, the variable compressor 150 does not perform image compression on the other areas than the area not changed from the previous frame, i.e., non-dynamic object areas, thereby reducing the size of the image data.

According to an embodiment, the variable compressor 150 may perform lossless compression on the region of interest while performing lossy compression on the dynamic object. For example, when the image has a first resolution, the variable compressor 150 may perform lossless compression on the region of interest to have the first resolution. In other words, the region of interest may have the resolution of the original image.

Meanwhile, the variable compressor 150 may perform lossy compression on the dynamic object to have a second resolution lower than the first resolution. This is because the region of interest includes main information, but the remaining area of the dynamic object does not include main information. As such, it is possible to reduce the size of the image data by performing compression so that only the region of interest maintains the high resolution while the rest has a reduced resolution.

According to an embodiment, the variable compressor 150 may compress the image so that the region of interest, dynamic object, and the remaining area in the image have different resolutions. For example, the variable compressor 150 may compress the image so that the region of interest has the first resolution, the dynamic object has the second resolution, and the other area than the region of interest and the dynamic object has a third resolution. Here, the first resolution may be higher than the second resolution, and the second resolution may be higher than the third resolution.

According to an embodiment, the variable compressor 150 may periodically compress and transmit the entire image of the frame. In general, compression is performed on the changed portion in the entire image. Periodically compressing the entire image of the frame may increase the reliability of restoration of the image.

Step S740 may include step S741 in which the compression area determiner 151 receives an image, dynamic object, and region of interest, differentiates between to-be-compressed areas and between compression rates for the areas and provides the areas to the compression unit 152, step S742 in which the compression unit compresses the region of interest by a first compressor to an n−1th compressor and compresses the dynamic object by an nth compressor, and step S743 in which the compression data generator 153 generates one compression data based on the compression data output from the plurality of compressors.

If step S740 is done, the image searcher 170 searches for the dynamic object and/or object of interest in the videos of different times matching the condition inputted by the user and provides it (S750).

Step S750 may include step S751 in which the dynamic object search condition input unit 171 receives a search condition for searching for the image including the region of interest matching the condition inputted by the user, step S752 in which the per-condition search video extractor 172 extracts the image matching the search condition, and step S753 in which the time synchronizer 173 time-synchronizes images matching the same search condition among the images captured at different times. Accordingly, if a search condition is inputted, the time synchronizer 173 may assist playing a plurality of images matching the search condition.

Here, the time synchronizer 173 may include time synchronization software/software-equipped recorder/software-equipped storage. The time synchronization software may be equipped on a USB, CD, RAM, SSD, or HDD.

Therefore, the multi-resolution image processing device and method capable of processing recognition of a plurality of dynamic objects according to an embodiment of the present invention may recognize objects per dynamic object when there are a plurality of dynamic objects, move the region of interest according to the movement of the dynamic objects, break down the region of interest of the objects, compress them with multiple resolutions and transmit it, thereby minimizing the time required for storage and search.

Thus, it is possible to reduce communication data and minimize the storage space, thereby allowing the existing communication infrastructure and storage to be used as it is or minimizing an increase in cost.

The " . . . unit" used in an embodiment of the present invention may be implemented as a hardware component, a software component, and/or in a combination thereof. For example, the devices and components described herein may be implemented using one or more general-purpose or specific-purpose computers, such as processors, controllers, arithmetic logic units (ALUs), digital signal processors, micro-computers, field programmable arrays (FPAs), programmable logic units (PLUs), micro-processors, any other devices capable of executing and responding to instructions. The processing device or processor may perform an operating system (OS) and one or more software applications performed on the OS. The processing device or processor may access, store, manipulate or control, process, and generate data in response to the execution of the software. For illustration purposes, the processing device or processor may be a single one but it will be appreciated by one of ordinary skill in the art that a processing device may include a plurality of processing elements and/or a plurality of types of processing elements. For example, the processing device may include a plurality of processors or a single processor and a single controller. The server or device may have other various processing configurations, such as parallel processors.

The software may include computer programs, codes, instructions, or combinations of one or more thereof and may configure the processing device as it is operated as desired or may instruct the processing device independently or collectively. The software and/or data may be embodied permanently or temporarily in signal waves transmitted or computer storage media or devices, virtual equipment, physical devices, components, or any type of machine so as to provide instructions or data to the processing device or to be interpreted by the processing device. The software may be distributed over computer systems connected together via a network to be distributively stored or executed. The software and data may be stored in one or more computer readable recording media.

The methods according to the embodiments of the present invention may be implemented in the form of programming commands executable by various computer means, and the programming commands may be recorded in a computer-readable medium. The computer-readable medium may include programming commands, data files, or data structures, alone or in combinations thereof. The programming commands recorded in the medium may be specially designed and configured for the present invention or may be known and available to one of ordinary skill in the computer software-related art. Examples of the computer readable recording medium may include, but is not limited to, magnetic media, such as hard disks, floppy disks or magnetic tapes, optical media, such as CD-ROMs or DVDs, magneto-optical media, such as floptical disks, memories, such as ROMs, RAMs, or flash memories, or other hardware devices specially configured to retain and execute programming commands. Examples of the programming commands may include, but are not limited to, high-level language codes executable by a computer using, e.g., an interpreter, as well as machine language codes as created by a compiler. The above-described hardware devices may be configured to operate as one or more software modules to perform operations according to an embodiment of the present invention, or the software modules may be configured to operate as one or more hardware modules to perform the operations.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

What is claimed is:

1. A multi-resolution image processing device capable of recognition of a plurality of dynamic objects, comprising:
a dynamic object identifier extracting a motion vector from an input image and identifying a dynamic object;

a dynamic object ID imparter assigning an ID to the dynamic object identified by the dynamic object identifier;

a dynamic object artificial intelligence determiner determining an authenticity of the dynamic object identified by the dynamic object identifier based on a standard shape for each type of dynamic object learned and stored, classifying at least one object of interest and object of no interest designated by a user, and removing the object of no interest;

a region-of-interest detector extracting a feature point from the at least one object of interest and setting at least a portion of the object of interest as a region of interest;

a variable compressor compressing the image with different compression rates for the region of interest and the object of interest; and an image searcher searching for the dynamic object and/or the object of interest in videos of different times matching a condition inputted by the user, wherein the image searcher includes:

a dynamic object search condition input unit receiving a search condition for searching for an image including the object of interest matching the condition inputted by the user;

a per-condition search video extractor extracting an image matching the search condition; and a time synchronizer time-synchronizing images matching the same search condition among images captured at different times.

2. The multi-resolution image processing device of claim 1, wherein the dynamic object artificial intelligence determiner includes:

an object-of-interest designator designating the object of interest among dynamic objects based on the user's input information;

an object-of-interest ID maintaining storage maintaining an ID of the designated object of interest;

an object-of-no interest ID deleter filtering to delete an ID of a remaining dynamic object except for the object of interest among identified dynamic objects; and a learning determiner determining an authenticity of the object of interest based on the dynamic object learned and stored.

3. A multi-resolution image processing method capable of recognition of a plurality of dynamic objects, comprising the steps of:

extracting a motion vector from an input image and identifying a dynamic object, by a dynamic object identifier;

assigning an ID to the dynamic object identified by the dynamic object identifier, by a dynamic object ID imparter;

determining an authenticity of the dynamic object identified by the dynamic object identifier based on a standard shape for each type of dynamic object learned and stored, classifying at least one object of interest and object of no interest designated by a user, and removing the object of no interest, by a dynamic object artificial intelligence determiner;

extracting a feature point from the at least one object of interest and setting at least a portion of the object of interest as a region of interest, by a region-of-interest detector;

compressing the image with different compression rates for the region of interest and the object of interest, by a variable compressor; and searching for, and providing, the dynamic object and/or the object of interest in videos of different times matching a condition inputted by the user, by an image searcher, wherein the step of searching for and providing the dynamic object and/or the object of interest includes:

receiving a search condition for searching for an image including the object of interest matching the condition inputted by the user, by a dynamic object search condition input unit;

extracting an image matching the search condition;

time-synchronizing images matching the same search condition among images captured at different times; and backing up the synchronized images.

4. The multi-resolution image processing method of claim 3, wherein the step of assigning the ID of the identified dynamic object includes:

assigning the ID according to a type of the dynamic object, by a dynamic object ID allocator;

calculating the motion vector of the ID assigned dynamic object, by a dynamic object motion vector calculator; and storing the motion vector of the ID assigned dynamic object, by per-dynamic object motion vector storage.

5. The multi-resolution image processing method of claim 3, wherein the step of classifying at least one object of interest and object of no interest designated by the user and removing the object of no interest includes:

designating the object of interest among dynamic objects based on the user's input information, by an object-of-interest designator;

maintaining an ID of the designated object of interest, by an object-of-interest ID maintaining storage;

filtering to delete an ID of a remaining dynamic object (an ID of an object of no interest) except for the object of interest among identified dynamic objects, by an object-of-no interest ID deleter; and determining an authenticity of the object of interest based on the dynamic object learned and stored, by a learning determiner.

* * * * *